(12) United States Patent
Weraneck et al.

(10) Patent No.: US 12,065,981 B2
(45) Date of Patent: Aug. 20, 2024

(54) DEVICE FOR DETECTING THE STATE OF A FUEL INJECTOR

(71) Applicant: LIEBHERR-COMPONENTS DEGGENDORF GMBH, Deggendorf (DE)

(72) Inventors: Klaus Weraneck, Lalling (DE); Richard Pirkl, Regensburg (DE); Norbert Schoefbaenker, Ohlsdorf (AT); Josef Aspelmayr, Schwertberg (AT)

(73) Assignee: LIEBHERR-COMPONENTS DEGGENDORF GMBH, Deggendorf (DE)

( * ) Notice: Subject to any disclaimer, the term of this patent is extended or adjusted under 35 U.S.C. 154(b) by 0 days.

(21) Appl. No.: 17/997,492

(22) PCT Filed: Apr. 22, 2021

(86) PCT No.: PCT/EP2021/060501
§ 371 (c)(1),
(2) Date: Oct. 28, 2022

(87) PCT Pub. No.: WO2021/219481
PCT Pub. Date: Nov. 4, 2021

(65) Prior Publication Data
US 2023/0160353 A1 May 25, 2023

(30) Foreign Application Priority Data
Apr. 30, 2020 (DE) ...................... 10 2020 111 787.6

(51) Int. Cl.
*F02D 41/20* (2006.01)
*F02M 51/06* (2006.01)

(52) U.S. Cl.
CPC .......... *F02D 41/20* (2013.01); *F02M 51/061* (2013.01); *F02D 2041/2055* (2013.01)

(58) Field of Classification Search
CPC ...... F02D 41/20; F02D 41/2096; F02D 41/24; F02D 41/2467; F02D 2200/063;
(Continued)

(56) References Cited

U.S. PATENT DOCUMENTS 4,957,085 A * 9/1990 Sverdlin ................ F02M 61/16
123/41.31
6,120,005 A * 9/2000 Wright .................... F02D 41/20
251/129.09

(Continued)

FOREIGN PATENT DOCUMENTS

DE 102004001358 A1 8/2005
DE 102005019802 A1 11/2006
(Continued)

OTHER PUBLICATIONS

ISA European Patent Office, International Search Report Issued in Application No. PCT/EP2021/060501, Jul. 27, 2021, WIPO, 4 pages.

*Primary Examiner* — Logan M Kraft
*Assistant Examiner* — Johnny H Hoang
(74) *Attorney, Agent, or Firm* — McCoy Russell LLP

(57) ABSTRACT

A device comprises: an injector for injecting fuel into an engine combustion chamber, a switch formed by an injector housing and an injector nozzle needle and which changes its switching state depending on a closed or open state of the injector, an input line for supplying energy to an actuating element which adjusts the nozzle needle in its two states, an output line for conducting energy away from the actuating element, and an evaluation unit for detecting the switching state of the switch, wherein a first switch contact of the switch is connected to an electrical input line of the injector, a second switch contact of the switch is connected to ground, and the evaluation unit is configured to carry out a signal (Continued)

measurement on the input line and/or an output line to conclude a switch state.

19 Claims, 3 Drawing Sheets

(58) Field of Classification Search
CPC ....... F02D 2200/247; F02D 2041/2055; F02D 2041/2058; F02M 51/005; F02M 51/061; F02M 61/10; F02M 61/18; F02M 61/1886; F02M 65/00; F02M 65/005; F02M 2200/8046
See application file for complete search history.

(56) References Cited

U.S. PATENT DOCUMENTS

| | | | |
|---|---|---|---|
| 10,989,134 B2* | 4/2021 | Steininger | F02M 63/0028 |
| 2007/0152659 A1* | 7/2007 | Gurich | F02M 65/005 |
| | | | 324/207.16 |
| 2008/0042624 A1* | 2/2008 | Augesky | H02N 2/067 |
| | | | 320/166 |
| 2016/0252034 A1* | 9/2016 | Li | F02M 63/0026 |
| | | | 239/4 |
| 2016/0298563 A1* | 10/2016 | Zhang | F02D 41/401 |
| 2017/0085178 A1* | 3/2017 | Larosa | H02M 3/156 |
| 2017/0268473 A1* | 9/2017 | Legrand | F02M 65/005 |
| 2020/0063694 A1* | 2/2020 | Zimmermann | F02M 21/0263 |
| 2020/0191088 A1* | 6/2020 | Steininger | F02M 57/005 |
| 2020/0256297 A1* | 8/2020 | Schoefbaenker | F02M 61/10 |

FOREIGN PATENT DOCUMENTS

| | | |
|---|---|---|
| DE | 102017116379 A1 | 1/2019 |
| DE | 202018100337 U1 | 4/2019 |
| DE | 102018125803 A1 | 4/2020 |
| WO | 2019016380 A1 | 1/2019 |

* cited by examiner

DEVICE FOR DETECTING THE STATE OF A FUEL INJECTOR

CROSS REFERENCE TO RELATED APPLICATIONS

The present application is a U.S. National Phase of International Application No. PCT/EP2021/060501 entitled "DEVICE FOR DETECTING THE STATE OF A FUEL INJECTOR," and filed on Apr. 22, 2021. International Application No. PCT/EP2021/060501 claims priority to German Patent Application No. 10 2020 111 787.6 filed on Apr. 30, 2020. The entire contents of each of the above-listed applications are hereby incorporated by reference for all purposes.

TECHNICAL FIELD

The present invention relates to a device for detecting the state of a fuel injector.

BACKGROUND AND SUMMARY

Injection nozzles or injectors are typically used to inject a fuel into a combustion chamber of an engine. In this context, an engine in which such an injector is present if a control unit is informed about the exact opening time of the injector may be useful, so that, for example, there is a particularly narrow tolerance band for the injection quantity of the fuel delivered by the injector, which may also be useful with regard to the overall product service life of the injector.

In addition, a plurality of engine control or monitoring functions may be useful if the exact injection time at which the injector delivers a fuel is known.

It is known from the prior art to use an electrical switch formed by the nozzle needle and injector housing to detect the state of the injector. Here, the switch is closed when the injector is not energized and the nozzle needle of the injector does not move out of its nozzle needle seat in the injector housing, so that it is ensured that no fuel escapes from the injector. As soon as the nozzle needle moves out of its nozzle needle seat, there is no longer a conductive connection between them, which causes the electrical switch to change its state, i.e. to transition into an open state. The switch changes its state again when the nozzle needle moves back into the nozzle needle seat, as this creates an electrically conductive connection and the switch formed by the components transitions into the closed state.

In the simplest form of state detection of an injector, a total of four lines lead into the housing of the injector, in which the switch is also located. Two lines are provided for the injector itself, whereas the other two lines are assigned to the switch. The disadvantage of this, however, is the high amount of cabling required for a unit formed in this way.

If a 3-pole or 4-pole plug is used, i.e. 3 or 4 lines run to the injector with switch, no additional effort is required at the detection circuit. On the other hand, this means additional work at the injector due to the multiple components and due to the connection components, which are to be dimensioned larger. A configuration with 4 lines is shown in FIG. 1, for example.

In a modification of this form also known from the prior art, the switch contacts are not directly accessible or are arranged isolated in the housing of the injector. Such a representation is shown in FIG. 2. Here, one pole of the switch is connected to a pin of the injector or a solenoid valve actuating the injector via a resistor. The other pole of the switch is also connected to the housing of the injector. In this case, the injector itself is normally connected to the ground, which can be the engine block, for example, in the case of use in a vehicle. In such an implementation, only two cables or lines lead out of the housing.

In normal operation, a voltage is applied to the injector or the solenoid valve actuating the injector, thus triggering a mechanical and/or hydraulic movement of the nozzle needle. The lifting or placing of the nozzle needle in turn opens or closes the switch. For example, it can be provided that the switch is closed by removing the voltage.

The problem with this type of state detection is that there can be an indefinite time delay between the application/removal of voltage to/from the injector or the solenoid valve and the triggering of the switch, i.e. the movement of the nozzle needle out of its seat or back into its seat, this being referred to as the so-called opening delay when the voltage is applied and closing delay when the voltage is removed, since the mechanical and/or hydraulic movement of the nozzle needle has a certain inertia. In the case of opening delay, the switch opens only after the voltage is applied. Due to this opening delay, it may be that the current supply has already ended when the switch opens. In the case of a closing delay, the switch only closes with a certain delay after the end of the current supply.

Notwithstanding the disadvantages mentioned above, it has proven to be expedient to measure the voltage applied to the input line and/or the output line in order to detect the switch state, as this allows conclusions to be drawn about an injection state or a closed state of the injector. It must be taken into account here that the switch cannot be loaded with high currents and, for reasons of efficiency, is limited to a few mA with the help of a resistor.

In the energized state, a magnetic field is built up via the coil, which is usually the actuating element of the nozzle needle, and induces an injection with a delay, the opening delay. This injection is equivalent to an opening of the switch. At the end of the current supply, the magnetic field is reduced, whereupon the injection ends with a delay, the closing delay. This means that the switch in the injector closes.

Closing and opening the switch changes the signal at the voltage-side contact, the high side HS, and the low-voltage-side contact, the low side LS. This signal change can be detected by means of a voltage measurement in the evaluation unit.

The change when opening the switch is used to determine the start of injection and the closing of the switch indicates the end of injection.

Since the evaluation unit for such a state detection is usually located in a control unit of an engine, the so-called ECU (electronic control unit), the signal detection of the injector may be compatible with a large number of ECUs on the market. However, since the pins of an ECU sometimes only permit voltage measurement on the output side or the input side of the injector, it may be useful to provide an implementation that enables state detection and thereby performs a voltage measurement at only one contact of the injector. Preferably, the low side LS should be selected.

Since externally introduced interference only cancels out with a more complex differential measurement, the measurement at only one contact results in an overlapping of the useful signal with interference, which makes the detection of the voltage signal associated with a change of state of the switch more difficult.

Embodiments of the present disclosure provide an improved device for detecting the state of an injector.

The present invention enables clear detection of the switch state even in noisy environments that cause fluctuations in the signal to be detected. In addition, the invention further makes it possible to operate an injector with only two conducting cables. The presence of a third or even a fourth cable is not necessary despite the state detection.

The device according to the invention for detecting the state of a fuel injector comprises an injector for injecting fuel into an engine combustion chamber, a switch which is formed by an injector housing and an injector nozzle needle and changes its switching state depending on a closed or open state of the injector, an input line for supplying energy to an actuating element which adjusts the nozzle needle in its two states, an output line for conducting energy away from the actuating element, and an evaluation unit for detecting the switching state of the switch, wherein a first switch contact of the switch is connected to an electrical input line of the injector, a second switch contact of the switch is connected to ground, and the evaluation unit is configured to carry out a signal measurement, in particular a voltage measurement at the input line and/or an output line, in order to conclude a switch state. The invention is characterized in that a signal filter is provided, which comprises only passive components and is connected between the evaluation unit and the input line and/or between the evaluation unit and the output line of the injector in order to emphasize a signal generated by the switching of the switch.

According to an optional modification, it is provided that the injector is further provided with an electronic control unit which comprises the evaluation unit, is connected by a first connection to the input line and by a second connection to the output line, and is configured to apply a higher voltage, in particular a supply voltage, to the input line than to the output line for actuating the actuating element, wherein preferably the voltage difference between input line and output line is 12V, 24V or 48V.

According to the invention, it can further be provided, that the first switch contact is connected to the input line of the injector via a resistor. This results in a voltage variation to be detected when the switch is closed or opened.

According to a further development of the invention, it can be provided that the second switch contact is connected to the same ground as the electrical circuit controlling the injector; preferably, the ground is the body or an engine block of a vehicle.

Further, according to the invention, it can be provided that the injector and the switch are arranged in a common housing which comprises an input line, an output line and a ground connection and preferably has no further connections for electrical signals.

According to an optional modification of the invention, it can be provided that the actuating element is a solenoid valve, preferably configured to cause a change of state of the injector by raising or lowering the nozzle needle, which in turn causes a change of state of the switch.

Further, according to the invention, the evaluation unit can perform a signal measurement, in particular a voltage measurement, either at the input line or the output line in order to conclude a switch state, wherein preferably the signal measurement of the evaluation unit takes place at the output line.

The input line can be the HS, i.e. the line to which a high voltage is applied, and the output line can be the low-voltage side LS, i.e. the line to which a lower voltage is applied. The current flow is controlled via the HS.

According to the invention, it can be provided that the passive components for forming the signal filter are resistors, capacitors, coils, oscillators or trimmers. The combination of passive components does not require any voltage levels other than those already present (for example the supply voltage). This means that there is no additional outlay brought about by the generation of a stable control voltage. This is especially so since this would also have to be protected against interference.

According to an optional development, it can be provided that the signal filter comprises or is a pull-up resistor and/or a pull-down resistor in order to effect an amplification of the voltage change that is detected at the evaluation unit. By providing a pull-up resistor and/or a pull-down resistor, it is possible to increase the signal level generated by the switching of the switch. Since the interference on the line to be measured does not experience a corresponding increase, the SNR (signal-to-noise ratio) increases and enables a more reliable detection of a switching state of the switch and thus also of the injector.

A pull-up resistor leading from the input line or output line can be connected to a supply voltage so that, for example, opening the switch with a pull-up resistor arranged in the output line leads to an increase in the signal level to the level of the supply voltage.

If this level is too high for detection by the evaluation unit, a voltage splitter can be created by means of a further resistor which is connected to ground, is connected in series with the pull-up resistor, and which, with suitable dimensioning of the resistor values, allows a desired voltage level to be achieved with an open switch.

According to the invention, it can further be provided that the signal filter is integrated in a cabling leading to the input line or in a cabling leading away from the output line, preferably is arranged here in a cable harness.

Due to the possibility of providing the signal filter also in a cable harness or in the corresponding cabling of the input line or the output line, it is also possible to integrate the filter subsequently, wherein a replacement of the injector is not necessary here.

It can also be provided that the signal filter is arranged in an electronic control unit, wherein not every control unit has capacities for converting or subsequently adding the signal filter. For this reason, the signal filter may consist only of passive components and can also be arranged in the cabling.

According to the invention, it can be provided that the injector is a common-rail injector.

The invention further relates to an internal combustion engine comprising a device according to one of the above variants.

BRIEF DESCRIPTION OF THE FIGURES

Further features and details of the invention will become apparent from the following description of the figures, in which.

DETAILED DESCRIPTION

Figure 1:
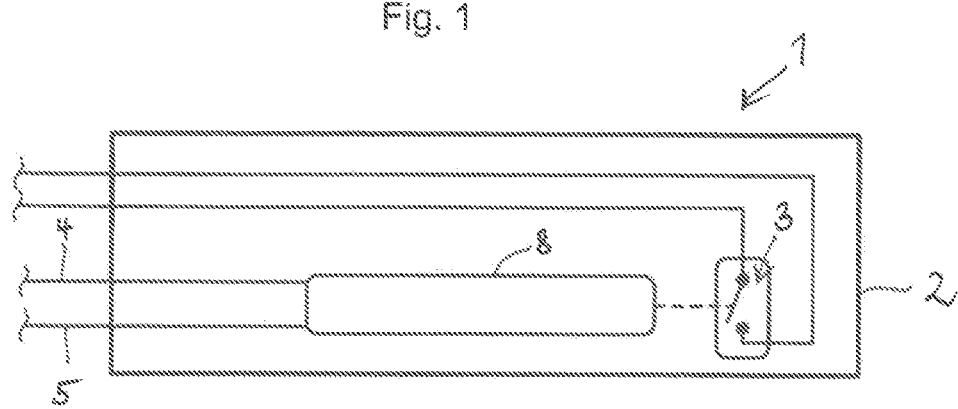
FIG. 1: shows a schematic depiction of a fuel injector with a state detection as known from the prior art.

FIG. 1 has already been explained in the introductory part of the description. Reference sign 2 shows there a fuel injector which has a total of four connection lines leading to the outside. The input line 4 in this case actuates an actuating element 8, which can lift a nozzle needle out of its nozzle needle seat. The output line 5 is also required there to close a circuit, so that the actuating element 8, which is configured as a coil, for example, can exert a magnetic force on the nozzle needle.

In order to now detect a state, i.e. whether the nozzle needle is in its nozzle needle seat, the nozzle needle together with the associated nozzle needle seat is used as a switch 3, wherein the two switch contacts (nozzle needle and nozzle needle seat) are each routed to the outside of the injector 2 via a separate line. The disadvantage of this is that separate lines are required to detect a switch state, which further increases the number of pins.

Figure 2:
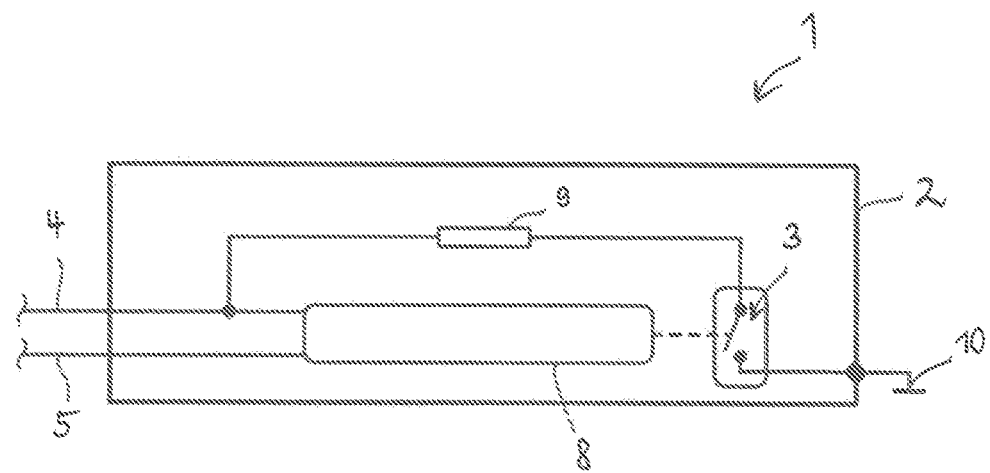
FIG. 2: shows a schematic depiction of a fuel injector with a reduced number of connection lines and a state detection.

FIG. 2 shows a schematic depiction of a further developed injector 2 which has integrated state detection. The contacts of the switch 3 are not directly accessible here, since one pole of the switch 3 is connected to the input line 4 and the other pole of the switch 3 is routed to ground 10. This is usually implemented so that the injector 2 itself is connected to the ground 10 of the engine block. In normal operation, a voltage is applied to the actuating element 8, which is usually a solenoid valve, which causes a mechanical and/or hydraulic movement of the nozzle needle and thus opens the switch 3. When the voltage is removed, the switch 3 is closed again.

In order to be able to detect the switch state, the voltage or a very small voltage change at the injector contacts 4, 5 must be measured.

Figure 3:
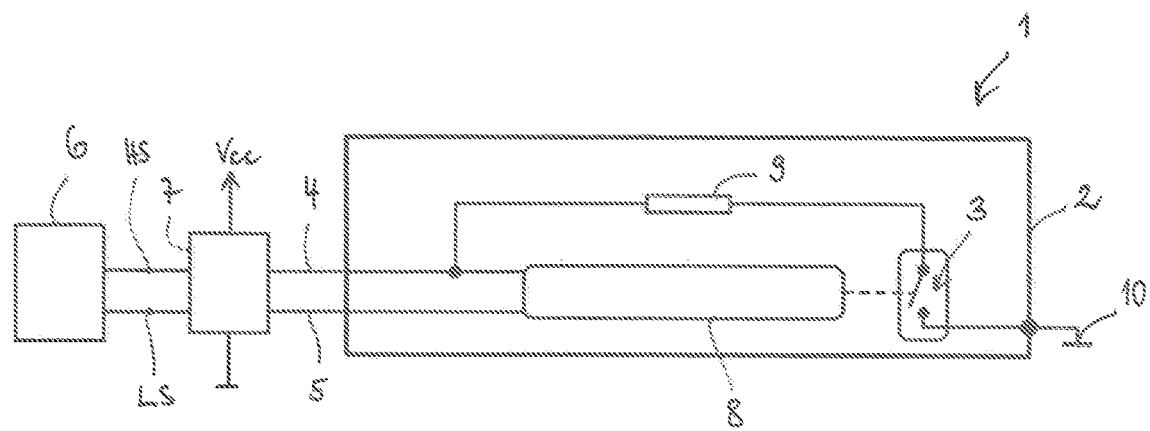
FIG. 3: shows an embodiment of the present invention in which a fuel injector for state injection is provided with a signal filter.

FIG. 3 shows a schematic structure of a device 1 according to the invention with an injector 2, a filter 7 and an evaluation unit 6, which can also be integrated in an electronic control unit (ECU). The injector 2 is operated via the two connections HS (high side) and LS (low side). In the energized state, a magnetic field is built up via the actuating element 8 and, with a delay, the opening delay, causes the nozzle needle to be lifted out of its nozzle needle set, thus triggering an injection. The injection is equivalent here to an opening of the switch 3. At the end of the current supply, the magnetic field is removed, whereupon the injection ends with a delay, the closing delay. This means a closing of the switch 3 in the injector 2. The signal at the input line 4 and the output line 5 is changed by the closing and the opening of the switch 3. This signal change can be detected by means of a voltage measurement in the evaluation unit 6. The change when the switch 3 is opened serves to determine the start of injection and the closing of the switch 3 indicates the end of the injection. The voltage only has to be measured at the output line 5 (or the LS) of the injector 2, which may mean no differential measurement is required, so that less complex evaluation units 6 can be used for a state detection. Since, as already explained in the introductory part, interference that can make level detection more difficult only cancels out with differential measurement, a measurement at only one contact, for example at the output channel 5, results in an overlapping of the useful signal with the interference. In order to filter this interference, the signal filter 7 is provided.

Figure 4:
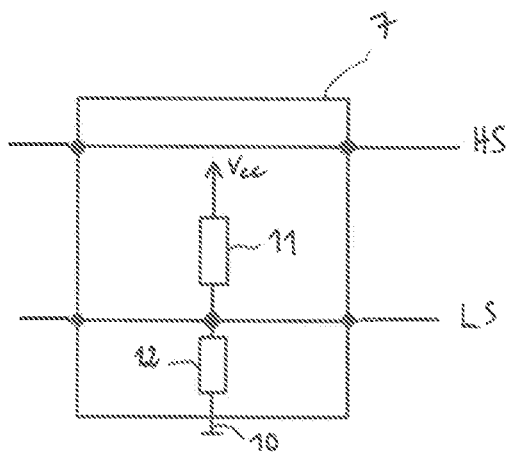
FIG. 4: shows an enlarged depiction of the signal filter, as used for example in FIG. 3, FIG. 5: shows three different depictions for improving the signal to be detected by increasing the amplitude or making the leading edge steeper.

FIG. 4 shows a possible combination of components for improving the signal quality or filtering the desired signal. Passive components should be selected for this purpose in order to keep the control effort as low as possible. In FIG. 4, the filter 7 is applied by way of example on the low side, wherein it is clear to a person skilled in the art that a correspondingly modified filtering can also be applied on the high side if this is desired.

Figure 5:
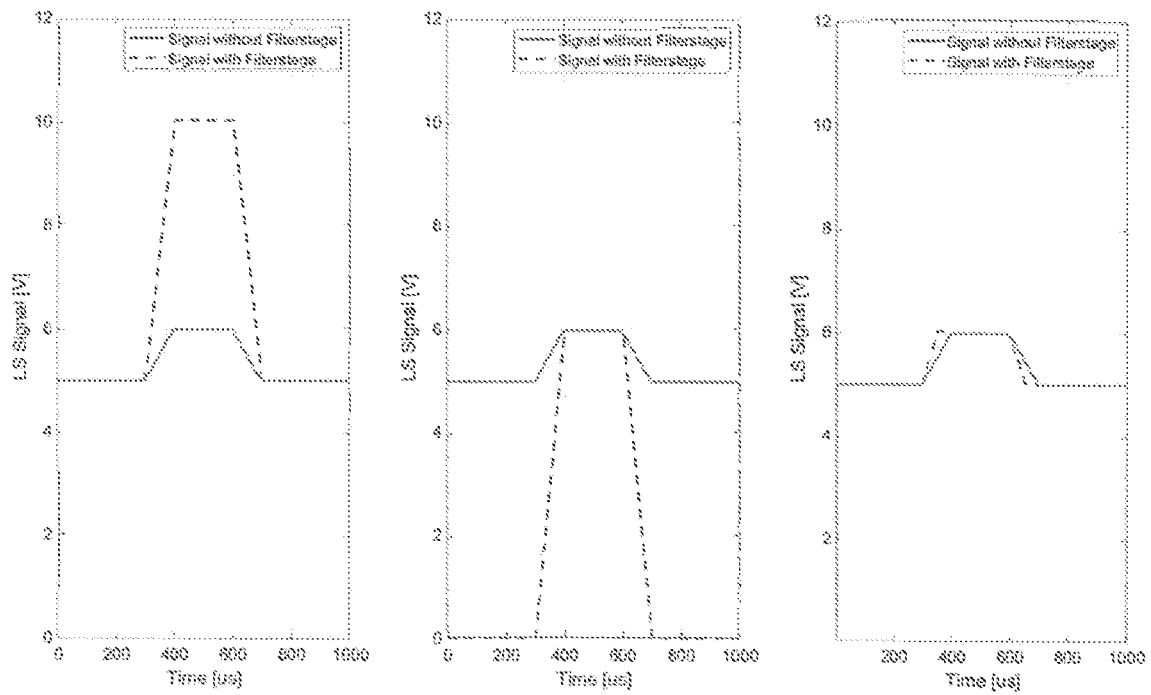

It can be seen that a pull-up resistor 11 is provided on the low side, i.e. on the output channel 5 of the injector, which connects the output channel 5 to the supply voltage $V_{CC}$. This allows a significantly higher signal amplitude to be achieved by filtering the useful signal, which can be seen in the left in FIG. 5, for example. An alternative to this can be found in the middle illustration, in which the useful signal is not boosted, but the magnitude of the carrier signal is reduced. This also thus results in a clear signal swing. The right-hand illustration in FIG. 5 contains a third variant for signal optimization, in which for example the amplitude is not increased, but a steeper edge rise is initiated during the switching process. Based on the control logic stored in the evaluation unit, one or a combination of the three methods shown in FIG. 5 can be effective in achieving the desired filtering of the target signal.

Figure 6:
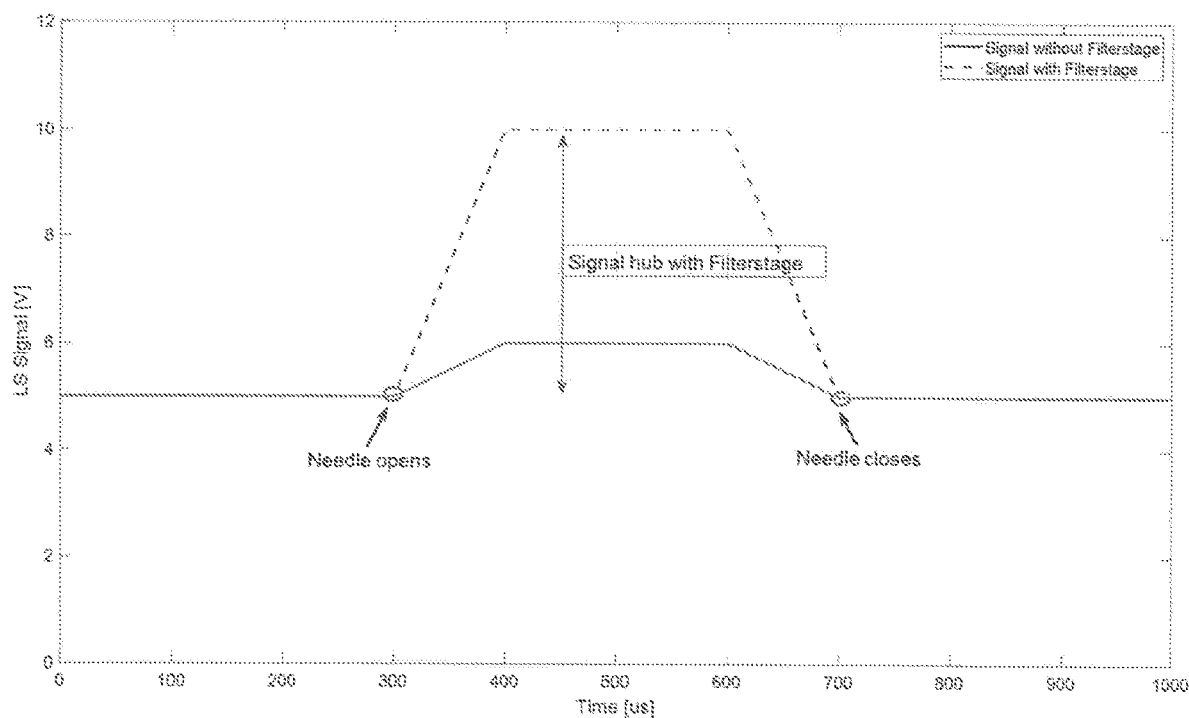
FIG. 6: shows a filtering of the signal to be detected on the low-voltage side of an injector with a pull-up resistor.

FIG. 6 shows the switching operations of the injector 2 and the associated change in voltage on the output line 5 or the low side. When the nozzle needle is lifted, the switch 3 opens and the contact via the internal resistor injector to ground is open-circuited. This raises the potential on the output line 5, where the signal swing is increased with the help of a resistor 11 that proceeds from said output line and leads to the supply voltage $V_{CC}$.

The resistance ratio of the described sides is determined by the evaluation unit 6 used, which can also be integrated in a control unit ECU. Limitations arise here due to the internal circuits in the control unit or the evaluation unit 6. Since the intended components of the filter 7 ultimately only work with ground 10 and supply voltage $V_{CC}$, no further source is necessary to implement the filter 7. This means that the filter can also be arranged in a cable harness and is therefore extremely easily retrofitted. If, on the other hand, there are evaluation units 6 or control units that can only carry out voltage detection in a certain voltage range, a suitable voltage splitter can be created in addition to the pull-up resistor 11 by means of a further resistor 12 that is connected to the ground 10 and proceeds from the output line 5. This configuration is shown in FIG. 4. If the switch 3 opens and the control element 8 is a coil, a defined voltage value is applied to the output channel 5 due to the voltage splitter consisting of the pull-up resistor 11 and the additional resistor 12.

Certain embodiments of the present invention improve the signal quality for a single-point measurement of an injector. In some embodiments, the single-point measurement allows simple adaptation to different control units from different manufacturers since most control units can monitor at least one contact for the control of the injector at its voltage level. In addition, certain embodiments can be realized in the control unit but can also be subsequently integrated into the cable harness if the control unit lacks internal resources. By combining these approaches, the signal-to-noise ratio can be increased, whereby a reliable status detection of the switching process can be realized even with a lower resolution of the voltage detection.

The use of passive components does not require any further voltages than those already present. This means that there is no additional outlay due to the additional provision of a stable control voltage, which would also have to be protected against interference. In an exemplary variant, it is sufficient to connect the LS contact to the supply voltage via a resistor 11 to increase the signal amplitude during the switching process.

In general terms, the circuit embodied in accordance with the invention uses a combination of passive components using supply voltage and ground.

The invention claimed is:

1. A device for detecting a state of a fuel injector, the device comprising:
   an injector for injecting fuel into an engine combustion chamber,
   a switch which is formed by an injector housing and an injector nozzle needle and changes its switching state depending on a closed or open state of the injector,
   an input line for supplying energy to an actuating element which adjusts the injector nozzle needle in its two states,
   an output line for conducting energy away from the actuating element, and
   an evaluation unit for detecting the switching state of the switch,
   wherein
   a first switch contact of the switch is connected to an electrical input line of the injector,
   a second switch contact of the switch is connected to ground, and
   the evaluation unit is configured to carry out a signal measurement in order to conclude a switch state, comprising
   a signal filter comprising only passive components and connected between the evaluation unit and the input line and between the evaluation unit and the output line of the injector in order to emphasize a signal generated by switching the switch.

2. The device according to claim 1, further comprising an electronic control unit which comprises the evaluation unit, is connected by respective connections to the input line and the output line, and is configured to apply a higher voltage to the input line than to the output line for actuating the actuating element.

3. The device according to claim 2, wherein a voltage difference between input line and output line is 12V, 24V, or 48V.

4. The device according to claim 1, wherein the first switch contact is connected to the input line of the injector via a resistor.

5. The device according to claim 1, wherein the second switch contact is connected to the same ground as an electrical circuit of the injector.

6. The device according to claim 5, wherein the ground is a body or an engine block of a vehicle.

7. The device according to claim 1, wherein the injector and the switch are arranged in a common housing which comprises an input line, an output line, and a ground connection.

8. The device according to claim 1, wherein the actuating element is a solenoid valve.

9. The device according to claim 8, wherein the solenoid valve is configured to cause a change of state of the injector by raising or lowering the injector nozzle needle, which in turn causes a change of state of the switch.

10. The device according to claim 1, wherein the evaluation unit performs the signal measurement either at the input line or the output line in order to conclude the switch state.

11. The device according to claim 10, wherein the signal measurement of the evaluation unit takes place at the output line.

12. The device according to claim 1, wherein the passive components for forming the signal filter are resistors, capacitors, coils, oscillators, or trimmers.

13. The device according to claim 1, wherein the signal filter comprises or is a pull-up resistor or a pull-down resistor in order to detect an absolute voltage at the input line or the output line.

14. The device according to claim 13, wherein the pull-up resistor leading from the input line or output line is connected to a supply voltage.

15. The device according to claim 1, wherein the signal filter is integrated in a cabling leading to the input line or in a cabling leading away from the output line.

16. The device according to claim 15, wherein the cabling leading to the input line or the cabling leading away from the output line are arranged in a cable harness.

17. The device according to claim 1, wherein the signal filter is arranged in an electronic control unit.

18. The device according to claim 1, wherein the injector is a common-rail injector.

19. An internal combustion engine comprising the device according to claim 1.

* * * * *